United States Patent [19]

Richards, Sr.

[11] Patent Number: 4,504,142

[45] Date of Patent: Mar. 12, 1985

[54] PHOTOGRAPHY PRINTING FRAME

[76] Inventor: Chester L. Richards, Sr., 1610 Sheridan Rd., Glendale, Calif. 91206

[21] Appl. No.: 535,429

[22] Filed: Sep. 26, 1983

[51] Int. Cl.³ .............................................. G03B 27/20
[52] U.S. Cl. ..................................................... 355/92
[58] Field of Search ........................ 355/91, 92, 93, 94, 355/95, 87, 73, 76; 354/203; 248/362, 363

[56] References Cited

U.S. PATENT DOCUMENTS

| | | | |
|---|---|---|---|
| 628,347 | 7/1899 | McDade | 355/94 |
| 725,969 | 4/1903 | Jaray | 355/92 |
| 3,995,955 | 12/1976 | Töpfer | 355/91 |

Primary Examiner—John Gonzales
Assistant Examiner—Brian W. Brown
Attorney, Agent, or Firm—Marvin H. Kleinberg

[57] ABSTRACT

An improved contact photo vacuum frame includes a specially constructed inflatable bladder which backs up the pressure blanket. The bladder is divided into a plurality of interconnected compartments by means of partitions, arranged in such a way that the compartments inflate sequentially, progressively forcing the air from between the contacting photo films in a predetermined pattern, insuring more intimate contact between the films. Alternative embodiments provide specific inflation patterns. A vacuum source can operate simultaneously to evacuate the volume between the film layers.

15 Claims, 5 Drawing Figures

PHOTOGRAPHY PRINTING FRAME

BACKGROUND OF INVENTION

The present invention relates to photographic printing and more particularly to an improved vacuum frame.

One of the most useful tools in the graphic arts industry is the vacuum contact frame which is used for making contact photographic prints. The vacuum frame should be distinguished from the vacuum platen or easel, which is used in cameras or enlargers, to hold large sheets of film at the focal plane of the camera lens or in focus. In contact printing, a transparent mask sheet is placed in intimate contact with a sheet of light sensitive material.

In the two major graphic arts applications, the light sensitive material may be photographic film or photo sensitive printing plates. For this discussion, we will call the photosensitive medium a film. The mask may contain a positive or negative image, depending on whether the photo sensitive material responds in a positive or negative way to light (e.g. some photo printing plates are positive responding). During the exposure, light passes through the mask and into the light sensitive film. Where the mask is opaque, the light is blocked and the underlying photo film remains unexposed. By this means the pattern of the mask is transferred to the photo film.

In order to retain sharpness during the transfer exposure it is necessary for the mask and photo film to be in intimate contact. If the mask and film sheets are merely pressed together, bubbles of air will remain between them and the resulting uncontrolled separation will cause local blurring and loss of definition of the transferred image.

Vacuum frames have been in use for many years to help prevent this problem. In the vacuum frame, the two sheets of film are placed under a glass top plate and are supported on the bottom by a flexible pressure blanket. The edges of the blanket are sealed against the glass plate in such a way that the air may be drawn out of the resulting glass/blanket chamber. This evacuation of air from the chamber causes the external air at ambient pressure to force the blanket up against the mask/film sandwich. The force of the blanket against the film helps force out the air from between the film sheets. A vacuum pump draws off this air so that, once full contact between the sheets is made, the contact will remain for the duration of the evacuation.

There are two significant problems with this arrangement. The first is that it takes substantial time to withdraw the air from the space between the film sheets after the volume defined by the blanket has been evacuated. A second problem is that under strong vacuum, the high pressure of the blanket tends of press the edges of the film sheets together so as to form a seal which traps a residuum of air between the sheets, thus creating bubbles or pockets in which air is trapped. These bubbles keep portions of the mask and photo film separated, which results in blurred images. Moreover, the bubbles are not spatially stabilized and may "wander" around during the course of a long duration exposure.

Early attempts to alleviate the problem of trapped air bubbles involved pressing inflated bladders against the back of the mask/photo material sandwich. No attempt was made, in these early versions, to evacuate the sandwich region. An example is the photographic blueprint apparatus which is the subject of U.S. Pat. No. 628,347 McDade. This device consists of a simple frame with a glass top in which a single chambered, hand inflated bladder presses against the back of the photo medium sandwich.

A patent from a slightly later time, the patent to Jarney, U.S. Pat. No. 725,969, shows a mechanically pumped bladder arrangement which also includes a roller that is designed to squeeze out residual trapped bubbles of air.

More recently, U.S. Pat. No. 3,995,995, to Topfer, teaches the use of a simple inflatable backing bladder, in conjunction with a vacuum frame, to squeeze out remaining bubbles of air and speed the evacuation process. It should be noted that the combination fails to regulate or monitor the air flow.

Recently, a vacuum frame has been marketed which uses rollers on the backside of the pressure blanket that move from one edge of the blanket to the other. The purpose of the rollers is to progressively squeeze the air from one edge of the flm sandwich to the other. This frame is manufactured by the Theimer company of Germany. When everything works right, no air bubbles are left behind in the film sandwich and with such intimate contact it is theoretically possible to obtain sharp, controllable exposures. In practice, however, this roller arrangement has two significant defects. Some bubbles of air still remain, and the combination is slow to operate, requiring substantial set up time before an exposure can be made. This is a significant drawback in, for example, a production environment where time is an important factor.

What has been needed is a new way to extract all of the air from the film sandwich so that no bubbles are left behind. Moreover, the new way should be sufficiently gentle not to impose great pressure on the glass top plate. Further, if the evacuation process can be speeded, the productive efficiency of the vacuum frame will be much improved. According to the present invention an apparatus which exhibits both improvements is provided.

The present invention replaces roller assemblies and single chamber bladders with a progressively inflated, multichambered bladder. The bladder is divided into a plurality of interconnected and inflatable chambers. In the preferred embodiment, the chambers are constructed in such a way as to resemble flat pockets which inflate into low ceilinged cavities.

Pressurized air is introduced to a single innermost chamber, thereby inflating this chamber first. The innermost chamber is surrounded by a nested arrangement of additional chambers.

As the central chamber inflates, air bleeds to the next adjacent chamber causing its inflation sometime after the inflation of the first chamber. As each chamber of the arrangement is inflated, the inflation of the next chamber begins. This arrangement applies pressure first to a small, central area, and then, progressively, to regions closer to the edges of the film sandwich. This radial, "peristaltic" pressure wave gently squeezes the air towards all the edges of the film sandwich in such a way that no air bubbles in the film sandwich are left behind.

A further advantage accrues from this arrangement. Because of the efficiency of the concentric peristaltic motion, the air can be squeezed from between the sheets of film at a much faster rate than heretofore has been possible. This means that the vacuum frame, assisted by the pressurized blanket, can come to full stabilized vacuum in a much shorter period of time, with resulting improvements in productivity.

The innermost chamber, and all the other inner chambers of the nesting arrangement are offset to one side of the exposure area. This is because the mask/film sandwich is normally held in lateral alignment by a system of pins inserted through holes punched along one edge of the mask and photo film. In order to maintain best alignment, it is important that the pin edge of the film sandwich be pressed together first by the vacuum frame, with the residual air being gently squeezed from this edge towards the far edges of the sandwich. For this reason, the nested chamber arrangement should be skewed towards the pin edge of the exposure area.

In the preferred embodiment, the air that is evacuated from the vacuum chamber is pumped through the bladder to cause its inflation. It has also been found that it is not necessary that the bladder be fully sealed. A continuous air flow is maintained by having a bleeder valve leak air continuously into the vacuum chamber, maintaining the vacuum pump on during the entire depressurization period. In this arrangement, the relative pressure of the bladder against the pressure blanket and film sandwich can be fully controlled. Under preferred operating conditions, the applied pressure differential is kept at less than one-half atmosphere. It has been found experimentally that this reduced pressure actually causes a quicker and more uniform evacuation of the air from between the sheets of the contact masking film/photo film sandwich. The bladder need not contain a large volume of air and, in fact, can be quite thin, thereby enabling a rapid sequential inflation of the chambers.

In experimental models, exposures made appear to be sharper than those made using previously existing commercial frames. Moreover, the evacution time has been found to be nearly an order of magnitude less than the time required by the best of the prior art frames. Accordingly, a substantial increase in productivity is possible through the use of contact photo frames according to the present invention.

An alternative embodiment of the invention employs bladders with a nested chamber arrangement such that the innermost chamber is at the center of the pressure blanket instead of being displaced towards one edge. The surrounding outer chambers are arranged symmetrically, centered on the inner chamber. As the bladder assembly progressively inflates, it first applies a holding pressure to the central portion of the mask/film sandwich. This arrangement is thought to have advantages, especially in pump down speed, in those systems where pin alignment is not to be employed. In yet other embodiments the nested chambers are displaced so that pressure contact begins at one corner of the mask/film sandwich.

A further embodiment uses a different method of construction of the multiple chambered bladder assembly. In this embodiment, partitions are formed so as to directly connect the bottom side of the pressure blanket to the lower wall of the bladder assembly. These partitions are arranged in such a way as to create a plurality of chambers, each of which surrounds a portion, or all, of the inner chambers. This embodiment is more obvious than the preferred one, but it is harder to construct.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DESCRIPTION OF THE EMBODIMENTS

Figure 4:
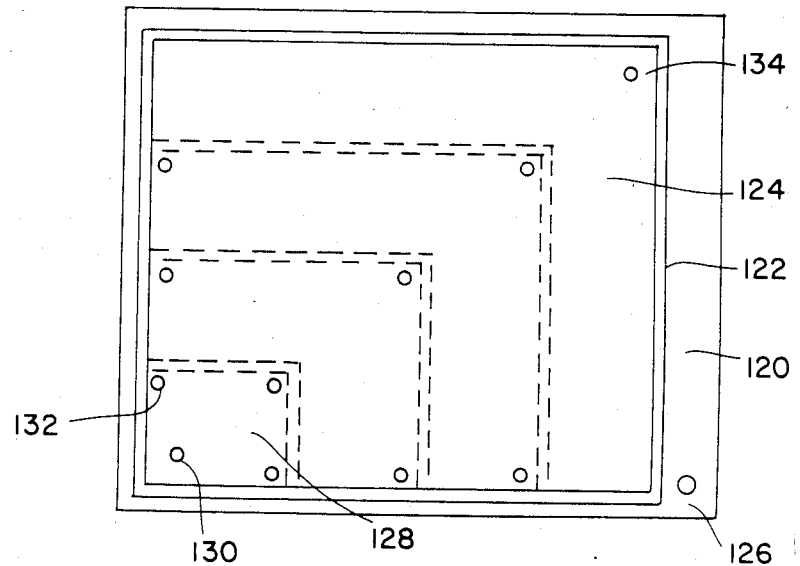
Figure 5:
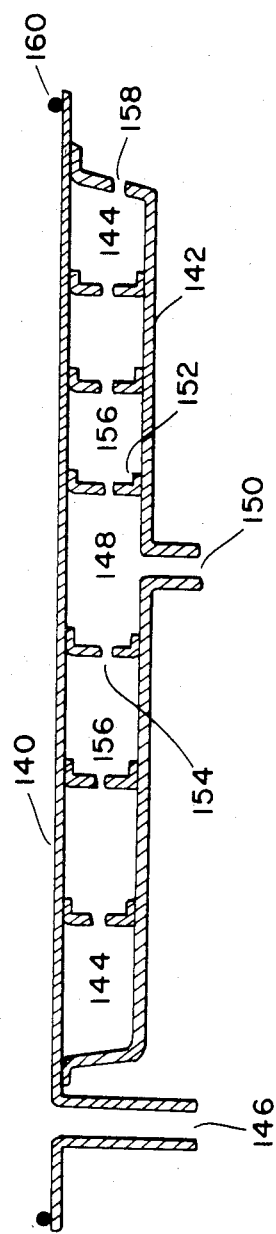

FIG. 4. is a plan view of an alternative embodiment of a bladder with the first chamber at a corner; and, FIG. 5 is a cross section through a blanket/bladder assembly using an alternative construction technique.

Figure 1:
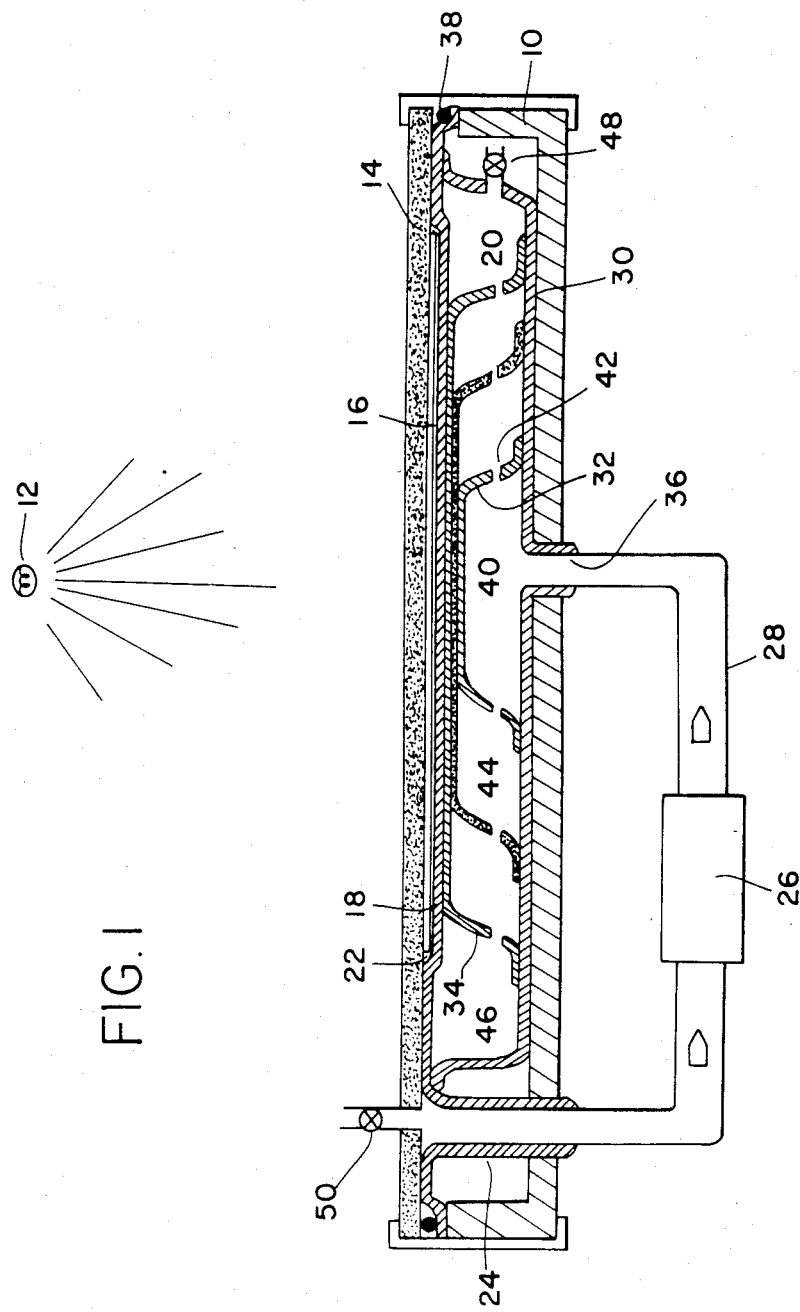
FIG. 1 shows a side sectional view of a vacuum frame according to the present invention.

Turning first to FIG. 1, there is shown in Frame 10 according to a preferred embodiment. Light shines from a light source 12, through a glass top plate 14, onto a mask (or negative) film/photo film sandwich 16. The top plate 14 may be opened or removed from the rest of the frame 10 so that the mask and photo sensitive material may be placed on a flexible, fluid impervious membrane or pressure blanket 18. Means are provided to retain the top plate 14 in close contact with the frame. The sandwich 16 is pressed against the glass plate 14 by the force of the flexible pressure blanket 18. The force on the pressure blanket 18 is exerted by the excess air pressure in a bladder element 20, below the blanket 18. The evacuation of air from region 22 between the blanket 18 and the glass top plate 14, takes place by extracting it through a port outlet 24.

The air, which is drawn from the evacuated region by a vacuum pump 26 is returned to the interior cavities of the bladder 20 by a tube 28. The bladder element 20 has a lower wall 30 which is supported by the backing plate of the rigid frame 10. Inside the bladder element 20 are partitions 32 and 34 which control the flow and distribution of air from an inlet port 36 to all regions of the bladder. In order to ensure the vacuum integrity of the vacuum frame, a sealing bead, or ring, 38 is fastened to the periphery of the blanket 18.

As air is pumped into the bladder 20 through the inlet port 36, it first inflates an innermost bladder chamber 40. This chamber is formed by cementing a thin, flexible sheet partition 32 around its edges to the lower wall 30 of the bladder assembly. As the innermost bladder chamber 40 inflates, it forms a flattened pocket chamber which gently presses a portion of the upper bladder walls against the blanket 18. The blanket 18, in turn, presses against a portion of the mask/film sandwich 16, thereby squeezing the air, from this portion of the sandwich, to the surrounding region.

As the innermost chamber 40 inflates and the pressure increases, air starts bleeding from the small holes 42 into the next bladder chamber 44 in the sequence. The second chamber wall 34 is constructed in substantially the same way as the first member wall 32, but it is somewhat larger. The holes 42 are kept sufficiently small that the next or second chamber 44 inflates substantially later than the first. Inflation of the second chamber 44 further squeezes the air towards the edges of the mask/film sandwich 16. The process of sequential inflation continues until all of the inner bladder chambers have been inflated.

After the air has bled through, and sequentially inflated, all the inner chambers of the bladder 20, it works its way into, and inflates, the outermost chamber 46. Finally, the pumped air is exited to ambient atmosphere through a small opening 48 in the outer bladder wall. The opening may be controlled by a valve (not shown) so that the total system flow is fully regulated.

A bleeder valve, 50, controls the flow of air into the vacuum side of the device. In general, it is not necessary that the bleeder valve 50 be mounted directly above the exhaust port 24, provided that the air flow from the valve 50 to the exhaust port 24 does not disturb the blanket 18 during the exposure period.

The bleeder valve 50 is set so that after the vacuum region 22 has been pumped down, and with the vacuum pump 26 constantly running, the partial pressure in the vacuum chamber region 22 is approximately half an atmosphere. In the preferred embodiment, the pressure in the bladder 20 is maintained, by means of a constant flow through of pumped air, at just slightly above ambient room air pressure. This provides just enough excess pressure to keep the bladder 20 inflated, without putting so much pressure on the blanket 18 that there is danger of the glass top plate 14 breaking due to excess force. Moreover, if the pressure differential between adjacent chambers is great, the air flow necessarily increases, thereby restoring equilibrium.

Figure 2:
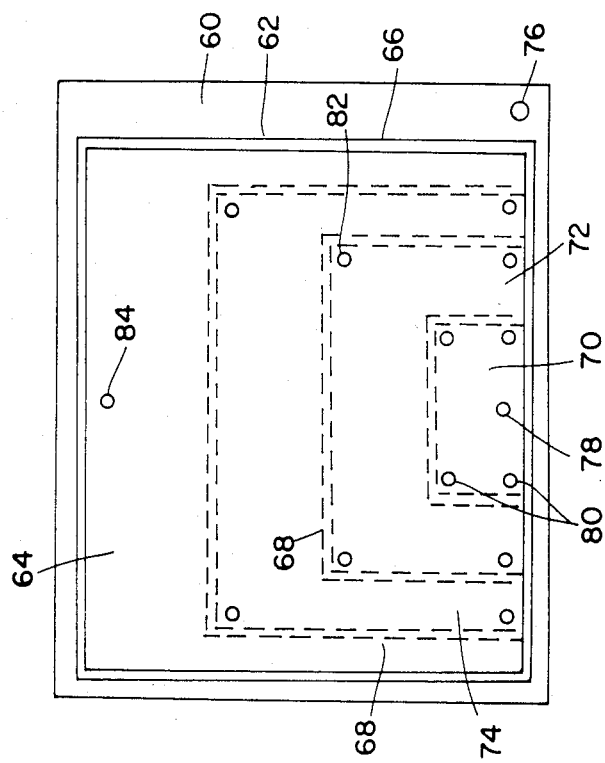
FIG. 2 is a bottom view of a representative blanket/bladder layout for the frame of FIG. 1.

FIG. 2 shows a bottom view of the bladder assembly of the preferred embodiment and enables an explanation of certain subtleties of the design. The edge of the pressure blanket 18 is indicated by 60. This edge 60 extends to the edge of the glass top plate 14 and forms a seal, with the usual assistance of an O-Ring beading (not shown). Usually the glass plate top 14 will have a metal or wood border (not shown) which holds the glass and against which the seal presses. This border is not shown in the figure. The outer boundary 62 of the blanket portion of the bladder assembly extends beyond the bladder region and includes an available lip whereby the back frame of the vacuum frame can press the blanket 18 against the glass top plate 14 and thereby form the seal of the vacuum region 22.

In FIG. 2 the bladder assembly, according to the present invention, consists of a nested arrangement of sub bladders constructed within the principal bladder 64. A lower wall 30 of the principal bladder 64 is formed by attaching, usually with room temperature vulcanizing rubber cement, a heavy, flexible sheet to the blanket edge 60. The attachment is made only around the periphery 66 of the lower wall. This leaves the central region of the wall free to balloon out as air is injected into the principal bladder 64.

Before the attachment of the lower wall is made, all of the inner bladders are first formed through attachments of sheets of thin, flexible material to the lower bladder wall 66. All the bladders are flat and resemble pockets. When inflated, they form thin, low ceilinged chambers.

As with the main lower wall of the bladder 64, the inner bladder pockets are formed by cementing the flexible sheet materials only around their edges 68. This permits free inflation of each bladder pocket and also of the series of bladders which are nested within each pocket. To the extent that residual air remains in each of the pockets, filling the first tends to partially inflate the others.

The nested bladders are constructed by first cementing the smallest sheet 70 to the bottom wall so as to make the innermost bladder pocket. A second, larger, sheet 72 is laid over the innermost sheet 70 and cemented around its edges to the lower wall 66 so as to make the next pocket bladder. A third sheet 74 is similarly attached over the two inner sheets to make a third level bladder. This sequence of attachment continues until all inner chamber pockets have been formed. Then the bottom wall 66 is attached, usually by cementing around its edges, to the bottom side of the pressure blanket 18.

The inflation process begins by drawing air from the vacuum side of the blanket 18 through the port 67, which corresponds to port 24 of FIG. 1. The air is recirculated and injected into the innermost bladder pocket through the inlet port 78 at a flow rate sufficient to insure rapid expansion of a bladder, notwithstanding the communication among the several bladder portions.

The innermost bladder inflates, applying gentle pressure to the local region of the pressure blanket. As the inflation pressure builds up, the excess air spills out through small holes 80 into the next bladder pocket chamber formed by the second sheet 72. This begins the inflation of this portion of the bladder and as it inflates, the excess air floods through small holes 82, which corresponds to 42 of FIG. 1, into a chamber defined by the third sheet 74.

The process continues until air starts to flood and inflate the principal bladder chamber 64. As the principal chamber 64 inflates, air starts flowing out of this chamber to the ambient surrounding world, through a final exit port 84 corresponding to port 48 in FIG. 1. The flow through this exit port 84 might be controlled by a valve, but experiments have shown that the size of the port 84 is not critical so long as it is small enough to restrict substantially the flow of air.

In the unusual case where it may be desirable to hold a vacuum for an indefinite period of time both the input bleeder valve 50 and the final outlet valve 48 could be shut off. When physical access to the vacuum chamber is again desired, both of the valves should be opened so that the pressure differentials can be released.

Normally, air flow continues for the duration of the time that a vacuum is required in the vacuum frame 10. The flow is maintained by leaving the vacuum pump 26 on. The continuous flow ensures that pressure differentials will be sufficiently small that self sealing of the mask/photo sensitive film edge does not occur and that no residual bubbles of air remain trapped between the mask and the photo material.

The structure of nested bladders is elaborated until the outermost bladder 64 chamber is constructed. It is important that each chamber wall sheet be cemented in such a way that the free movement and inflation of the inner chambers are not hampered. This free movenment gives a very uniform application of pressure to the blanket 18.

In FIG. 2, the number of concentric bladder chambers is shown as four. This is a representative illustration only and is not meant to imply an optimum design.

In the preferred embodiment, an interesting, and important, fine point of the design is that the nested bladders are not located at the geometric center of the pressure blanket 18. Instead, they are offset to be near the center of one edge of the blanket. The practical reason for this offset is that the mask and photo film are usually maintained in lateral registration by a pin system, whereby holes punched in the film sheets are maintained in perfect alignment by placing pins through these holes. These alignment holes and pins are normally placed along one edge of the film. Because this edge provides a position reference, it is important that the air be squeezed out from this edge first. It is also preferred that the air be squeezed out from the center of this edge first. Accordingly, the arrangement shown in FIG. 2 is uniquely suited to this purpose.

Note also that the sequential squeezing motion pushes air uniformly in all directions. This is in distinction to a roller system which, of necessity can only push air from one edge across to the opposite edge. Because of the radial flow that this sequential squeezing creates, the amount of effective edge available for evacuation is much larger for the sequentially inflated bladder type device than it is for the roller configuration. Thus, this invention provides for faster evacuation of the air from between the sheets of film, limited only by the time required to inflate the entire bladder 20.

Figure 3:
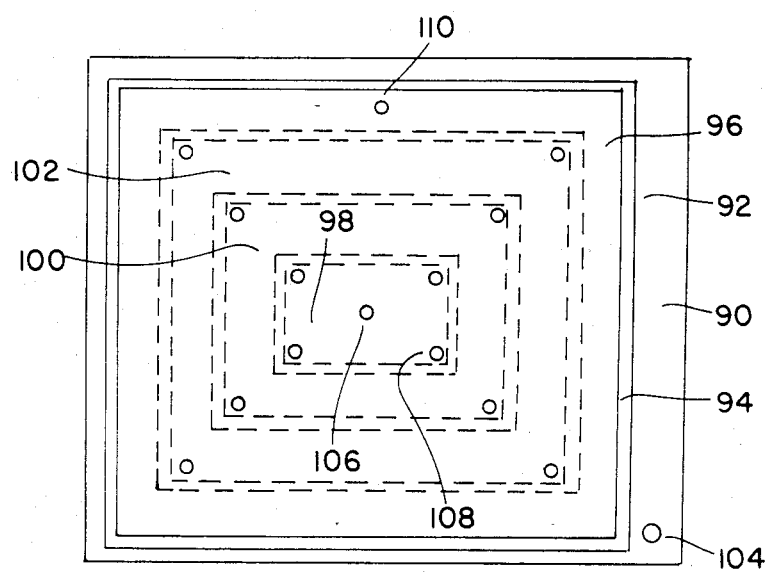
FIG. 3 is a plan view of an alternative embodiment of a bladder with a central inner chamber.

FIG. 3 illustrates a slightly different arrangement of the blanket-bladder subassembly. The construction is fundamentally the same as shown in FIG. 2, but in this embodiment, the nested pocket bladders are centered at the middle of a blanket and are concentric.

The assembly consists of a blanket 90 with a bottom wall member 92 cemented around its edge 94 to the bottom side of the blanket 90. The bottom wall forms the principal bladder chamber 96. Within this chamber are nested a series of inner pocket chambers 98, 100 and 102.

Air is evacuated from the top (vacuum) side of the blanket 90 through a port 104 and is injected into the innermost bladder pocket 98 through a port 106 in the bottom wall 92 of the principal bladder 96. The innermost pocket 98 inflates first with excess air spilling out through small holes 108 into the next bladder 100 in the nest. The spillover process occurs in a controlled sequence with each successive bladder chamber being inflated subsequent to the prior chambers. The principal chamber 96 is the last to inflate. As the principal chamber 96 inflates, the pumped air starts pouring through the final vent hole 110 to the surrounding environment.

FIG. 4 shows an arrangement of nested bladders similar those those of shown in FIGS. 2 and 3. In this embodiment, the inner bladder pockets or chambers are offset so that the mask/film sandwich is gently squeezed out from one corner.

The assembly consists of a blanket 120 with a bottom wall 122 forming a principal chamber 124. Air is drawn from the vacuum side of the blanket 120 through a port 126 and is pumped into an innermost chamber 128 through a port 130 through the bottom wall of the bladder assembly. The air inflates the inner chamber 120 and floods through vent holes 132 into the next chamber in the nest. Air floods each pocket chamber in turn until the principal chamber is inflated. The air in the system then escapes to ambient through the final controlled aperture vent port 134.

FIG. 5 show a different construction for the blanket/bladder subassembly. Experiments show that this arrangement is more difficult to construct and also, that is tends to bulge the pressure blanket locally in undesirable ways. Therefore, this embodiment, while a part of the present invention, should be considered less than preferred.

FIG. 5 is a cross section through the bladder assembly. It is analogous to the bladder cross section illustrated in FIG. 1. The arrangement includes a pressure blanket 140 to which is attached a bottom wall 142, and which, together, form a principal chamber 144. In operation, air is pumped from the vacuum side of the blanket 140 through a port 146 and is returned to the innermost chamber 48 through a port 150.

The several inner chambers may be formed in several ways. Illustrated is a partitioning scheme where inner walls 152 are attached between the blanket 140 and the bottom wall 142. An alternative involves cementing the bottom wall directly to the blanket in regions where a partition is desired. This latter approach is easier to construct, but it tends to excessively bulge the pressure blanket and is therefore less desirable.

When the innermost chamber 148 is inflated, the excess air spills out, through small vent holes 154, into the next bladder chamber 156 in the sequence. The sequential inflation and spillover continues until the outer, principal, chamber 144 is inflated. The air flow eventually passes to ambient through a final, controlled, vent port 158.

In addition to the bladder chamber construction a bead type O-ring seal 160 is attached around the edge of the pressure blanket. This helps seal off the vacuum region by forming a seal of the blanket against the glass top plate of the vacuum frame.

A prefered embodiment, consisting of a vacuum frame, with a flexible blanket/bladder having several sequentially inflated inner compartments has been shown and described herein. It is obvious to anyone skilled in the art that this is not the only configuration which embodies the principles of the invention, and, therefore, numerous changes and additions may be made without departing from the spirit and scope of the invention.

I claim:

1. For use with a photographic printing frame, apparatus for enhancing the contact between a mask and a photosensitive sheet in the vacuum environment existing between a transparent plate and a flexible, fluid impervious membrane of the printing frame, comprising in combination:
    (a) a backing plate, substantially parallel to the transparent plate;
    (b) a pressurizable bladder, having a series of interconnected chambers arranged in a predetermined spatial alignment, to be positioned betweeen said plate and the transparent plate;
    (c) means for sequentially inflating said bladder chambers for applying a force pressing the photosensitive sheet against the mask and the transparent plate in a predetermined spatial pattern,
    whereby any air trapped between the mask and the photosensitive sheet can be forced out into the vacuum environment, thereby improving the contact between the mask and the photosensitive sheet.

2. The apparatus in claim 1, above, further including:
    (d) a pump means having an intake and an exhaust; and
    (e) means coupling said pump means intake to the vacuum environment and said pump means exhaust to said pressurizable bladder, whereby said pump means are used to create the vacuum environment and to inflate said bladder.

3. The apparatus of claim 1, above, wherein said bladder chambers are arranged in a nested relation for sequentially inflating said bladder to apply said force starting at one edge of the mask and sheet and proceeding across the mask and sheet to the opposite edge with a squeegee-like action, until all other edges are reached.

4. The apparatus of claim 1, above, wherein said bladder chambers are arranged in a nested relation for sequentially inflating said bladder from one corner whereby said force moves across the surface of the mask and sheet along the diagonal in wavelike fashion, gradually including the entire mask and photosensitive sheet.

5. The apparatus of claim 1, above, wherein said bladder chambers are arranged in a nested relation for sequentially inflating said bladder starting in the center and progressively radiating outwardly therefrom with a squeegee-like action until the edges are covered, gradually including the entire mask and photosensitive medium.

6. The combination with an improved vacuum frame for making photographic contact prints including a frame, a transparent plate, and a blanket for creating a vacuum chamber, of apparatus to improve the contact between a mask and a photosensitive material within the vacuum chamber, comprising in combination:
  (a) a backing plate connected to the frame adjacent the blanket;
  (b) a pressurizable bladder interposed between said backing plate and the photosensitive material, said bladder including a plurality of interconnected chambers in a predetermined spatial arrangement; and
  (c) means to inflate said bladder chambers,
  whereby a pressure force is exerted upon the photosensitive material and the mask against the transparent plate in a predetermined pattern corresponding to said predetermined spatial arrangement, said pressing force squeezing out air entrapped between the mask and the photosensitive material.

7. The apparatus of claim 6 above, wherein said interconnected bladder chambers are arranged with an initial chamber at one corner of a generally rectangular bladder and the remaining chambers extend generally along a diagonal of the bladder.

8. The apparatus of claim 6, above, wherein said interconnected bladder chambers are arranged with an initial chamber at one edge of the bladder and the remaining chambers sequentially arranged across the bladder to the opposite edge.

9. The apparatus of claim 6, above, wherein said interconnected bladder chambers are arranged with an initial chamber near the center of the bladder, the remaining chambers are sequentially arranged to radiate from the center until the edges are reached.

10. The apparatus of claim 6 above, wherein said interconnected bladder chambers are arranged with an initial chamber near the middle of one edge and sequentially radiate outward therefrom until all the edges are reached.

11. In photographic contact printing, a method of improving the contact between a mask and a photosensitive sheet for printing purposes, comprising the steps of:
  (a) placing a sensitized medium in contact with the mask within a vacuum chamber formed between a transparent plate and a blanket sealed thereto;
  (b) providing a backing plate adjacent to said blanket;
  (c) interposing an inflatable bladder having a plurality of interconnected chambers between said backing plate and the reverse surface of said sensitized medium;
  (d) simultaneously evacuating the vacuum chamber and inflating said bladder;
  (e) inflating the bladder chambers sequentially in predetermined order to press the medium and mask against said transparent plate intially at a preselected area and, subsequently, at adjacent areas radiating therefrom,
  whereby sequential application of pressure forces trapped inclusions of air from between the mask and the sensitized medium into the vacuum chamber for evacuation therefrom.

12. The method of claim 11 above wherein the inflating step commences in a chamber at one corner of a generally rectangular bladder and progresses sequentially generally along a diagonal of the bladder.

13. The method of claim 11 above wherein the inflating step commences in a chamber at one edge of the bladder and progresses sequentially across the bladder to the opposite edge.

14. The method of claim 11 above wherein the inflating step commenced in a chamber that is near the center of the bladder and progresses sequentially, radiating from the center until the edges are reached.

15. The method of claim 11 above wherein the inflating step commences near the middle of one edge and progresses sequentially radiating outward unitl all the edges are reached.

* * * * *